(12) United States Patent
Ehrlich

(10) Patent No.: US 6,808,849 B2
(45) Date of Patent: Oct. 26, 2004

(54) NEGATIVE ELECTRODE MATERIAL FOR NONAQUEOUS ELECTROCHEMICAL CELLS

(75) Inventor: Grant M. Ehrlich, Stonington, CT (US)

(73) Assignee: Yardney Technical Products, Inc., Pawcatuck, CT (US)

( * ) Notice: Subject to any disclaimer, the term of this patent is extended or adjusted under 35 U.S.C. 154(b) by 0 days.

(21) Appl. No.: 10/269,293

(22) Filed: Oct. 11, 2002

(65) Prior Publication Data

US 2003/0064291 A1 Apr. 3, 2003

Related U.S. Application Data

(62) Division of application No. 09/616,209, filed on Jul. 14, 2000, now abandoned.
(60) Provisional application No. 60/143,871, filed on Jul. 15, 1999.
(51) Int. Cl.[7] .................................................. H01M 4/32
(52) U.S. Cl. .................... 429/223; 429/217; 429/218.1; 429/231.95; 429/245; 427/123; 427/191; 427/201
(58) Field of Search ............................ 429/231.95, 223, 429/217, 218.1, 245; 427/123, 191, 201

(56) References Cited

U.S. PATENT DOCUMENTS

| 6,210,839 B1 | * | 4/2001 | Gan et al. .................... 429/307 |
| 2002/0015889 A1 | * | 2/2002 | Yamamoto et al. ..... 429/231.95 |

FOREIGN PATENT DOCUMENTS

| JP | 10-334887 | * 12/1998 |
| JP | 11-3710 | * 1/1999 |

* cited by examiner

*Primary Examiner*—Laura Weiner
(74) *Attorney, Agent, or Firm*—John R. Doherty

(57) ABSTRACT

A negative electrode material is provided for a rechargeable lithium-ion electrochemical cell comprising an intimate mixture of finely-divided elemental nickel and tin particles characterized in that the total oxygen content of said material is less than about 6 percent by weight of the mixture. Preferably, the negative electrode material comprises from about 5 to 90 percent by weight nickel particles and from about 10 to 95 percent by weight tin particles, the nickel and tin particles being composed of discrete, non-spherical, smooth particles of a size ranging from about 1 to 10 micrometers and having a density which is greater than about 5 grams per milliter and a specific surface area of less than about 1 square meter per gram.

12 Claims, 8 Drawing Sheets

SEM photograph (2,000X magnification) of material A (ball : material ratio 1:1)

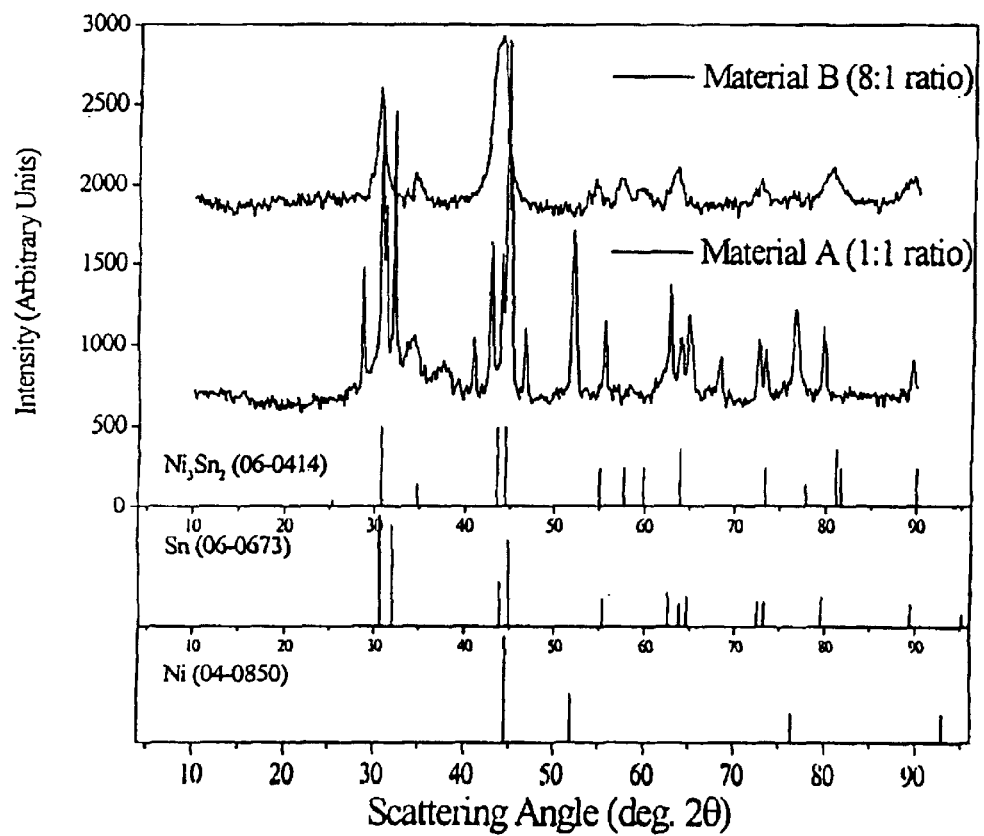
Figure 2, X-ray powder diffraction patterns for materials A and B and the calculated, idealized patterns for Ni, Sn and $Ni_3Sn_2$.

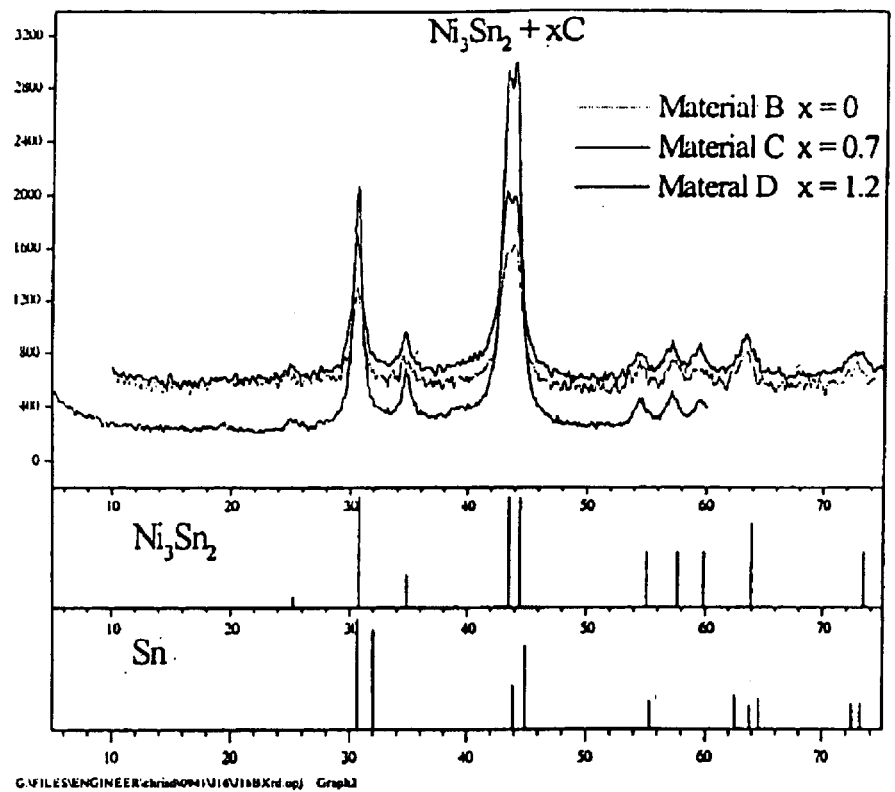
Figure 3. X-ray diffraction patterns for materials B, C, and D, mechanically alloyed $Ni_3Sn_2$, $Ni_3Sn_2$-$C_{0.7}$, and $Ni_3Sn_2$-$C_{1.2}$, and the calculated idealized pattern for Sn and $Ni_3Sn_2$.
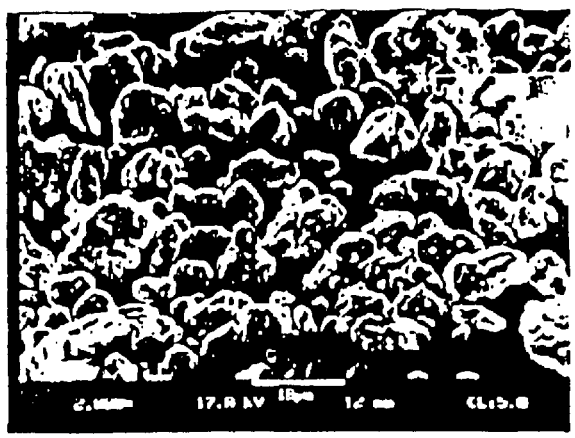
Figure 4. SEM photograph (2,000X magnification) of material A (ball : material ratio 1:1)

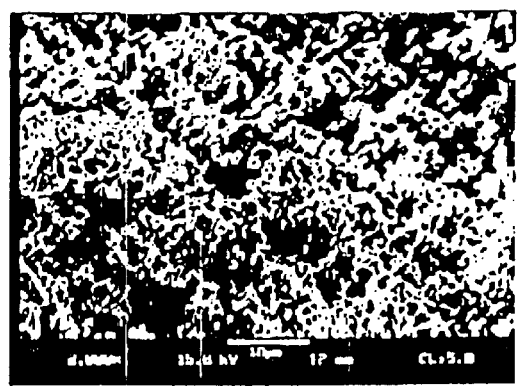
Figure 5. SEM photograph (2,000X magnification) of material B (ball : material ratio 8:1)
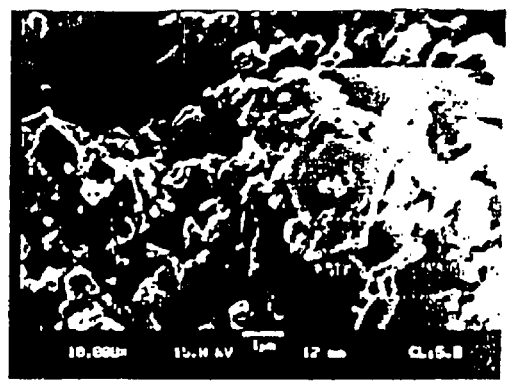
Figure 6 SEM photograph (10,000X magnification) of material B (ball : material ratio 8:1)

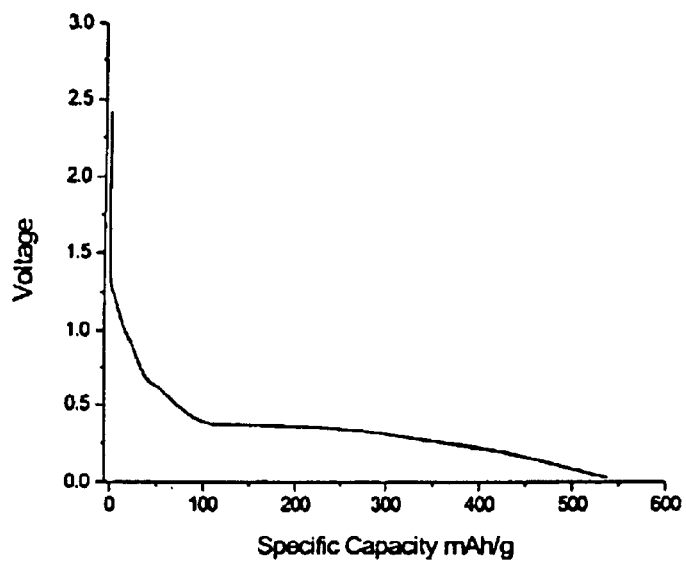
Figure 7. First cycle discharge curve for material A.
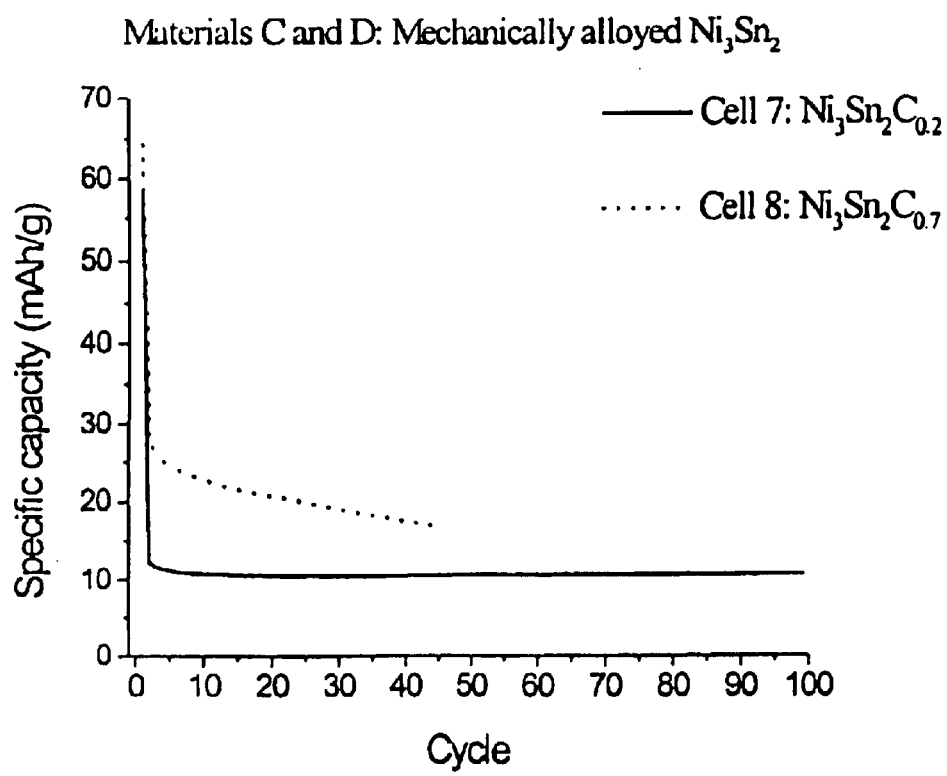
Figure 10

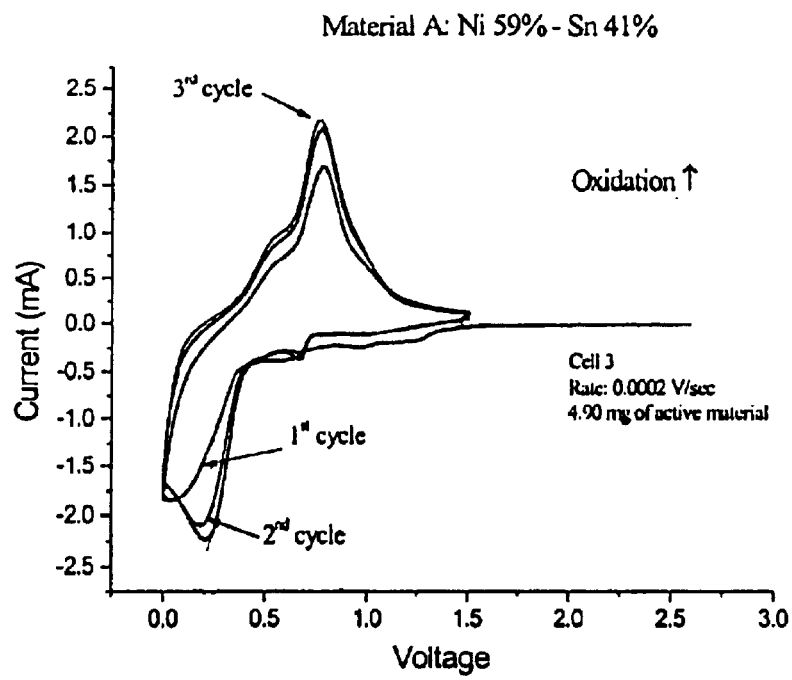
Figure 8. Cyclic voltammogram of the nickel-tin material.
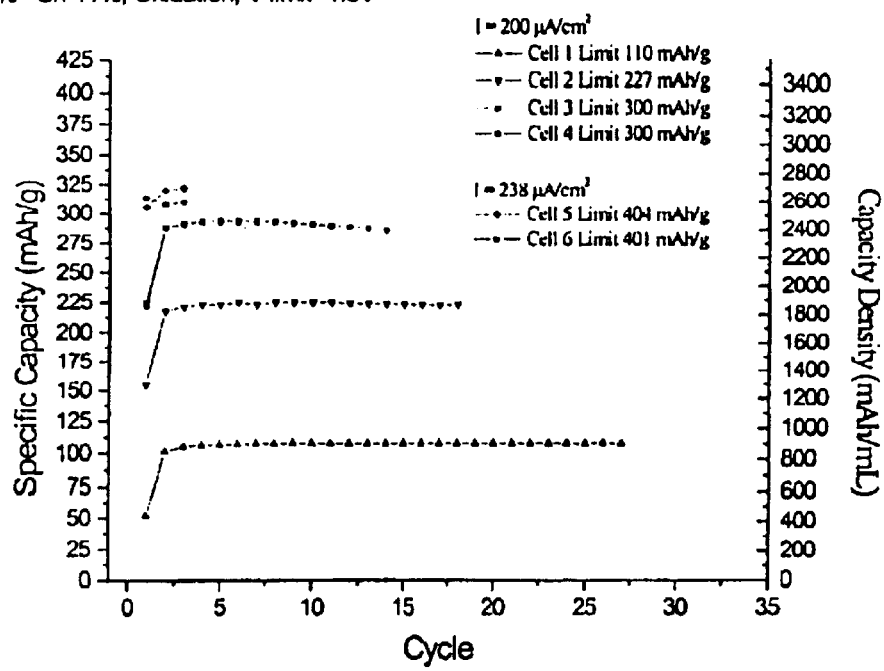
Figure 9. Specific capacity and capacity density of nickel-tin materials when cycled galvanostatically at 200 µA/cm$^2$ between 0 and 1.5V.

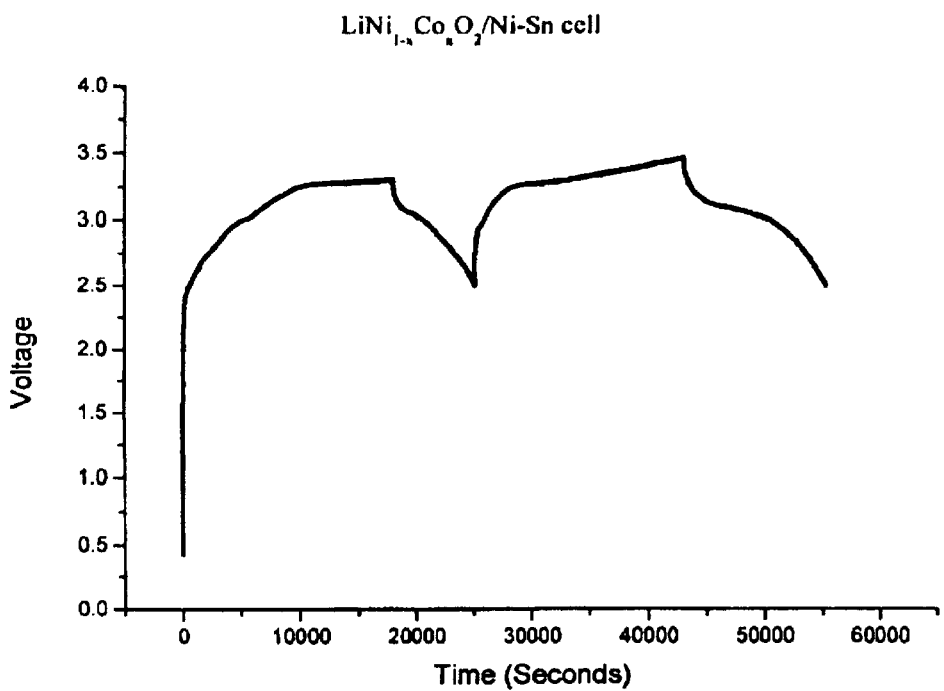
Figure 11. Voltage of a LiNi$_{1-x}$Co$_x$O$_2$/Ni-Sn cell over the first two cycles.
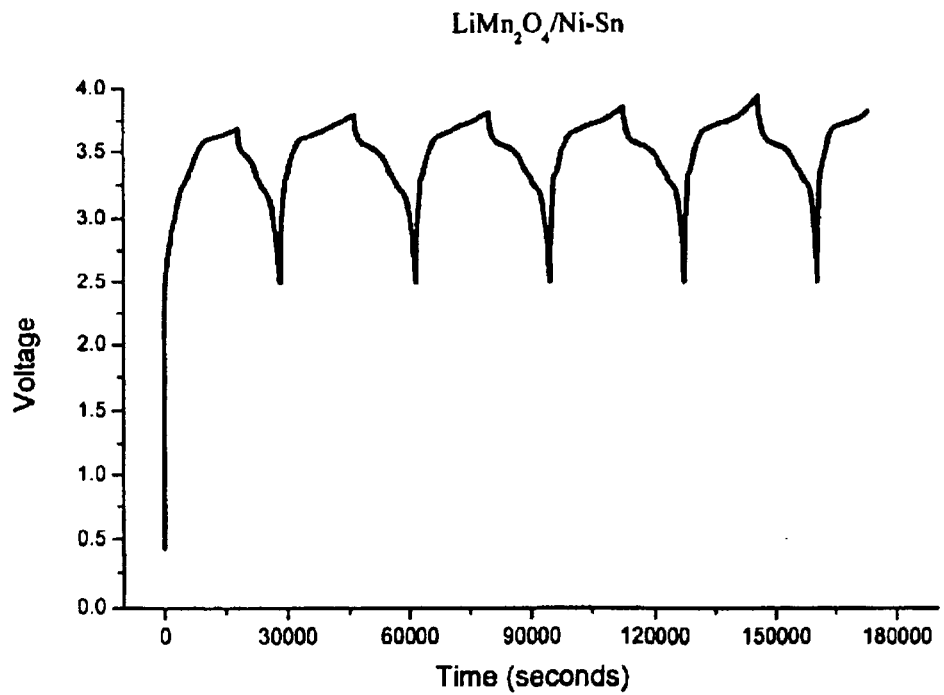
Figure 12. Voltage of a LiMn$_2$O$_4$/Ni-Sn cell over the first 5 cycles.

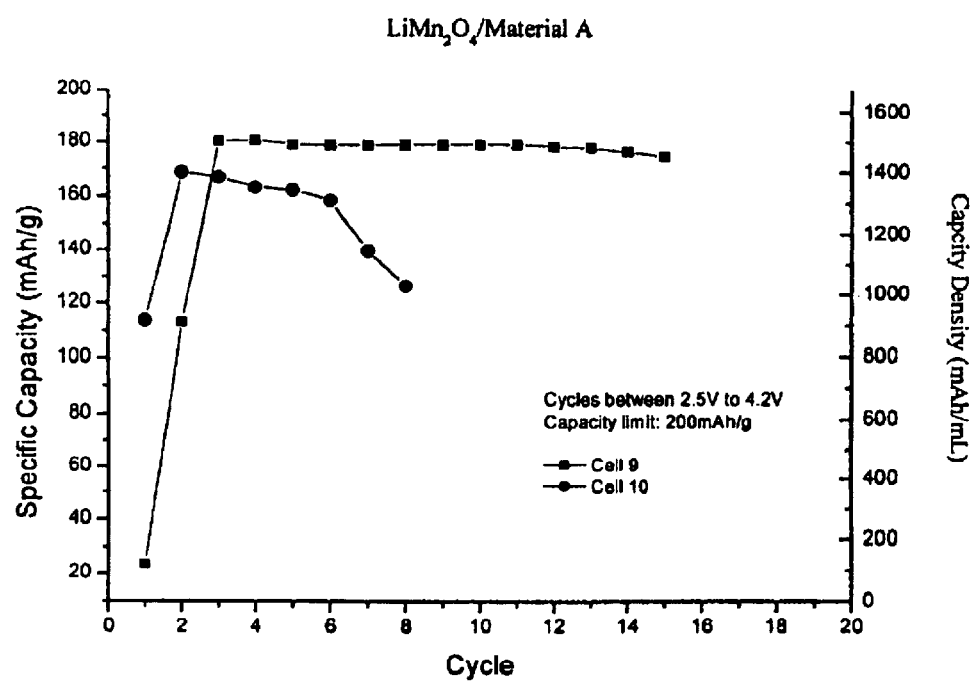
Figure 13. The discharge capacity of $LiMn_2O_4$/Ni-Sn cells over the first 9 cycles.

NEGATIVE ELECTRODE MATERIAL FOR NONAQUEOUS ELECTROCHEMICAL CELLS

This application is a division of application Ser. No. 09/616,209, filed Jul. 14, 2000, now abandoned which claims priority to provisional application Ser. No. 60/143,871, filed Jul. 15, 1999.

FIELD OF THE INVENTION

This invention relates generally to nonaqueous rechargeable electrochemical cells and particularly to rechargeable lithium-ion cells and to a novel negative electrode material having improved capacity and cycle life for use in such cells.

DESCRIPTION OF THE PRIOR ART

The negative electrode material in state of the art lithium-ion cells consists of carbon (graphite) as its active material, bonded to a metallic current collector with a polymeric binder. In a lithium-ion cell, this negative electrode material serves to reversibly accept lithium through an intercalation or alloying process. Intercalation typically occurs in the case of layered or tunneled materials whereas alloying may occur in metallic materials.

To improve the performance of lithium-ion cells, including cell capacity and cell safety, materials with a capacity higher than graphite and with improved safety properties are required. When lithium is intercalated into graphite upon charging of a lithium-ion cell, its potential approaches that of lithium metal, raising concerns about the safety of the lithium-ion cell. Further, the reversible capacity possible with graphite electrode materials is currently limited to about 90 percent of the theoretical capacity of graphite or about 335 mAh/g, (740 mAh/ml).

With a view towards achieving higher cell capacity as well as safer negative electrode materials, there has been renewed interest in metallic materials that can reversibly accept lithium, particularly those which utilize the reversible reaction of lithium with tin as their basis. Such materials were originally investigated as electrode materials for lithium/metal sulfide batteries while yet further efforts pursued alloys of lithium with aluminum, tin, antimony, lead, indium or bismuth towards monolithic electrodes for lithium batteries. These efforts were not satisfactory, however, since the electrodes failed mechanically, crumbling upon repeated cycling. Efforts by Yang et al., for example, as disclosed in "Solid State Ionics 90" (1996), pages 281–287, found that the mechanical failure of metallic negative electrode materials was highly dependent on the metallic matrix morphology and that the failure of the material can be partially mitigated when two-phase metallic matrices are utilized.

Other recent efforts towards a tin based negative electrode material have focused on the development of materials based on tin oxide, oxides containing tin, or mixtures of tin oxide with other materials. Such materials were the subject of extensive investigation, for example, by Idota et al as reported in U.S. Pat. No. 5,618,640 and European Patent No. 0 651 450 B1. Similarly, others have investigated the utility of tin oxide as an electrode material in lithium-ion cells (T. A. Courtney et al., Journal of the Electrochemical Society 144 (1997), pages 2045 to 2052).

As is known in the prior art, the reversible process in tin oxide materials involves the alloying of tin metal with lithium. On the first cycle, oxygen in the material has been shown to react irreversibly with lithium to form lithia. Although the lithia is electrochemically inert, materials with reduced lithia content, such as those prepared from SnO, have to-date not offered the reversibility of those with more lithia, such $SnO_2$. The lithia has been proposed to accommodate the 300% volume expansion of the tin particle as it incorporates lithium, preventing mechanical failure of the material and promoting long cycle life. While tin oxide materials offer high specific capacity, e.g., 400 to 650 mAh/g, low capacity fade, less than 0.04 percent per cycle, good safety properties and broad materials compatibility, the high irreversible capacity on the first cycle, typically 1000 mAh/g for $SnO_2$, has precluded the commercial success of tin oxide based materials. Nonetheless, these studies demonstrate the performance possible given a tin based negative electrode material.

To mitigate the irreversible capacity associated with tin oxides, efforts have recently focused on non-oxide tin materials. Some efforts have focused on the development of active/inactive composites wherein the active phase, tin or a tin compound, was incorporated into an inactive phase, such as a tin-iron material. These efforts sought to have the inactive phase serve the function of the lithia in the tin oxide materials to avoid the irreversible capacity associated with the formation of lithia. While these efforts demonstrate that a wide variety of tin containing materials can reversibly incorporate lithium, these materials either do not offer the capacity demonstrated with tin oxide or have associated with them high irreversible of the tin oxide materials.

BRIEF DESCRIPTION OF THE INVENTION

According to the invention, an improved negative electrochemical cell comprising an intimate mixture of finely-divided elemental nickel and tin particles, characterized in that the oxygen content in said mixture is actually less than about 6 percent by weight of the mixture. Because of its low oxygen content, the negative electrode material of the invention has a small irreversible capacity and offers improved capacity and cycle life performance comparable to prior art tin oxide based materials. It is postulated that the nickel in this mixture, while inactive to lithium, does serve to accommodate the volume change of the tin as the tin incorporates lithium during charging of the cell.

In a more specific aspect, the invention provides an improved negative electrode for a rechargeable lithium-ion electrochemical cell comprising a mixture containing from about 5 to 90 percent by weight of finely-divided nickel particles and from about 10 to 95 percent by weight of finely-divided tin particles and having an oxygen content of less than about 2.3 percent by weight of the mixture. Based on the level of oxides that may be present in the material, mostly as surface contaminants or impurities, the particulate mixture may contain oxygen in amounts less than about 50 percent by weight and preferably less than about 1.0 percent by weight.

The negative electrode material of the invention is preferably prepared by mixing finely-divided nickel and tin powders in a ball or shaker mill inside a sealed container or vial under an inert gas such as argon. It has been found that when the powders are mixed in a ball to material weight ratio of about 1:1, the resultant material is essentially elemental nickel and tin but that when the ball to material weight ratio is substantially increased, say to about 8:1, the elemental nickel and tin powders alloy to form a nickel-tin compound, $Ni_3Sn_2$. This nickel-tin compound is both physically and chemically different and offers lower capacity and cycle life when compared to the elemental nickel-tin electrode material of the invention.

The nickel-tin electrode material of the invention is composed of discrete, non-spherical, smooth particles of a size ranging from about 1 to 10 micrometers ($\mu$m). The particles have a density which is greater than about 5 grams per milliter and a specific surface area of less than about 1 square meter per gram. X-ray diffraction patterns taken on the material show the presence of peaks associated with elemental tin and nickel and the absence of peaks associated with the compound $Ni_3Sn_2$.

Electrodes for rechargeable lithium-ion batteries may be prepared by coating a suspension of the elemental nickel-tin mixture along with a polymeric binder onto a metal foil such as a nickel foil, for example.

The invention also contemplates the preparation of rechargeable lithium-ion electrochemical cells using negative electrodes composed of the elemental nickel-tin electrode material.

BRIEF DESCRIPTION OF THE DRAWINGS

In the accompanying drawings:

FIG. 2 are X-ray powder diffraction patterns for the elemental nickel-tin negative electrode material embodying the invention, designated "A", and the pattern for the tin based compound $Ni_3Sn_2$, designated "B", along with the calculated idealized patterns for nickel (Ni), tin (Sn) and the compound $Ni_3Sn_2$.

FIG. 3 are X-ray powder diffraction patterns for two other tin based negative electrode materials designated "C" and "D", along with the pattern for material B and the calculated idealized patterns for tin (Sn) and the compound $Ni_3Sn_2$;

FIG. 4 is a photomicrograph of the negative electrode material "A" shown in FIG. 2, taken at 2,000×magnification;

FIG. 5 is a photomicrograph of material "B" shown in FIG. 2, taken at the same magnification;

FIG. 6 is a photomicrograph of material "B", taken at 10,000×magnification.

FIG. 7 is a discharge curve illustrating the first cycle discharge characteristics of a Li-ion cell employing the negative electrode material "A" shown in FIGS. 2 and 4;

FIG. 8 is a cyclic voltammogram curve showing the cyclic characteristics of the same negative electrode material of the invention;

FIG. 9 are a group of curves showing the specific capacity and capacity density of material "A" when cycled galvanostatically at 200 microamperes per square centimeter between 0 and 1.5 volts.

FIG. 10 is a curve similar to those of FIG. 9, showing the galvanostatic cycling of two tin based negative electrode materials designated "C" and "D" in FIG. 3;

FIG. 11 is a voltage/time curve showing the performance of a $LiNi_{1-x}CoO_2$/Ni—Sn cell over the first two cycles of operation;

FIG. 12 is a similar curve showing the performance of a $LiMn_2O_4$/Ni—Sn cell the first five cycles; and FIG. 13 is a group of curves similar to those shown in FIG. 9, showing the discharge capacity of the $LiMn_2O_4$/Ni—Sn cell of FIG. 11.

DESCRIPTION OF THE PREFERRED EMBODIMENTS

Figure 1:
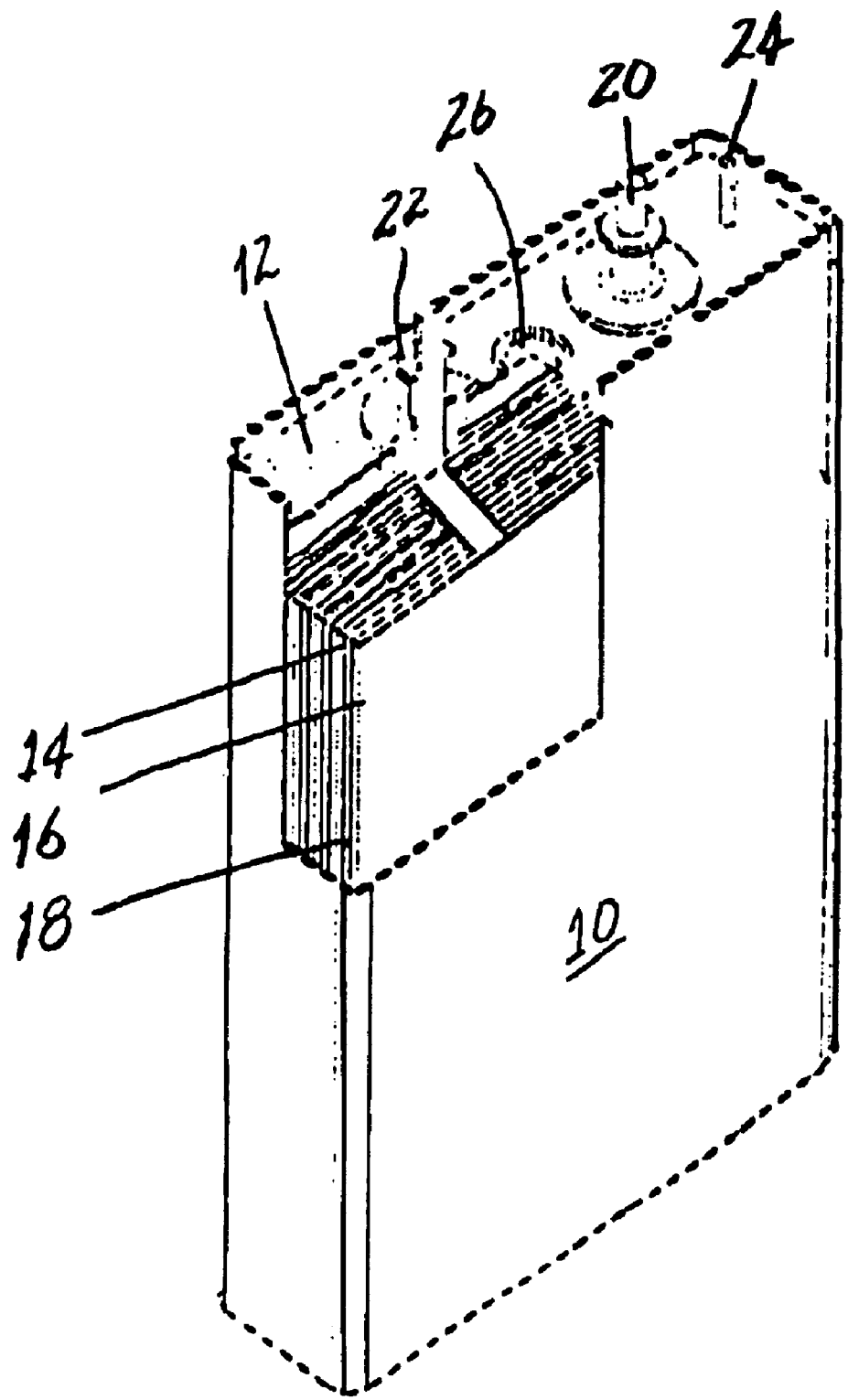
FIG. 1 is a schematic view of a prismatic lithium-ion electrochemical cell embodying the invention.

Referring now to FIG. 1 of the drawings, there is shown a typical prismatic lithium-ion electrochemical cell embodying the invention. The cell comprises a casing 10 having a top cover 12, both suitably made of an insulating plastic material, and containing a plurality of coated electrodes, including positive electrodes 14 and negative electrodes 16 separated by a porous separator material 18, such as a microporous sheet of polyethylene, containing an electrolyte. Typically, the electrolyte may be a lithium hexafluorophosphate solution in an organic carbonate.

The cover 12 includes a pair of positive and negative terminal assemblies 20 and 22, connected respectively to the positive electrodes 14 and the negative electrodes 16 within the casing 10. The cover 12 also includes a fill port 24 and a rupture disk 26 operable to release high internal pressures that may build up inside the casing 10.

In prior art lithium-ion electrochemical cells, the positive electrode material is usually composed of a lithium metal oxide compound, such as a lithium cobalt oxide or lithium manganese oxide, for example, and the negative electrode material is carbon (graphite) or metal oxide such as tin oxide. The negative electrode material serves to reversibly accept lithium through an intercalation or alloying process upon charging the cell. As described hereinabove, the use of carbon (graphite) or tin oxide as the negative electrode material seriously limits the over-all capacity and performance of the lithium-ion cell.

According to the invention, a high capacity density tin based negative electrode material is provided for a Li-ion electrolytic cell. The negative electrode material of the invention comprises a powdered composition containing elemental nickel and tin and is characterized as having a high density and a low oxygen content. These materials offer a capacity density over three times that possible with current materials and thus make possible the development of Li-ion cells having significantly improved performance. The nickel-tin electrode material of the invention has been demonstrated to offer high specific capacity (over 300 mAh/g), high capacity density (over 2500 mAh/ml) and low capacity fade when cycled versus either a spinel, $LiNi_{1-x}Co_xO_2$ or lithium counter electrode.

The nickel-tin electrode material of the invention contains from about 5 to 90 percent by weight finely-divided nickel particles and from about 10 to 95 percent by weight of finely-divided tin particles. The preferred composition is about 59 percent by weight nickel and about 41 percent tin. The negative electrode material of the invention is composed of discrete, non-spherical, smooth particles with low specific surface area, less than about 3 $m^2$/g, and high density, greater than about 5 g/ml, and a small particle size from about 1–10 micrometers ($\mu$m). The nickel-tin material has a low oxygen content, less than about 6% by weight and does not/contain significant amounts of oxides, ideally less than 1% but not more than 50%. The X-ray diffraction pattern of the material is characterized by the presence of peaks associated with elemental tin and nickel and the absence of peaks associated with $Ni_3Sn_2$. When characterized by voltammetry the material has two reduction peaks, a small one at 0.65V vs. Li and larger peak at 0.21V vs. Li, and an oxidation peak at 0.76V vs. Li.

The following experiments will serve to further illustrate the invention.

Tin powder (99.8%, Sn, −100 mesh) and nickel powder (99.9% Ni, −300 mesh) were shaken in a hardened steel vial containing two 12.7 mm hardened steel balls for about 20 hours using a Spec 8000D shaker mill. A sample material A was prepared using 13.86 grams of Ni and 19.4 grams of Sn with a 1:1 ball to material ratio by weight. The vials containing the mixture were sealed in air. Sample A is the negative electrode material of the invention. Additional sample materials B, C, D and E were prepared using an 8:1 ball to material weight ratio and vials were sealed under argon. The formulations used to prepare materials B, C, D and E. are included in Table 1 below.

TABLE I

Composition of Sample Materials

| Material | Ni (grams)   | Sn (grams)    | Carbon (grams) |
|----------|--------------|---------------|----------------|
| B        | 1.18 (59%)   | 0.82 (41%)    | 0.00           |
| C        | 1.15 (57%)   | 0.77 (38%)    | 0.077 (4%)     |
| D        | 0.835 (42%)  | 1.125 (55%)   | 0.04 (2%)      |
| E        | 0.823 (41%)  | 1.109 (55%)   | 0.067 (3%)     |

There is shown in FIG. 2 the X-ray powder diffraction pattern for materials A and B along with the idealized calculated patterns for nickel (Ni), tin (Sn) and the nickel-tin compound ($Ni_3Sn_2$). It will be seen from these X-ray diffraction patterns that material A is a mixture of elemental tin and nickel. It will be further seen from these patterns that material B contains the nickel-tin compound $Ni_3Sn_2$.

The densities of materials A and B were determined by He pycnometry. The density of both materials was found to be about 8.38 grams/millimeter. Since this density is higher than that calculated based on the density of both elements, the level of oxygen impurity is less than about 1 percent.

The specific surface areas of materials A was determined using a Quantachrome Nova 3200 instrument. The specific surface area of material A was found to be about 0.67 square meters per gram ($m^2/g$) and that of material B to be about 0.47 $m^2/g$. It is believed that surface areas greater than about 3 $m^2/g$ introduce additional, undesired, irreversible capacity.

In FIG. 3, there are shown X-ray diffraction patterns for materials B, (the compound $Ni_3Sn_2$), C (the mixture $Ni_3Sn_2$—$C_{0.7}$), and D (the mixture $Ni_3Sn_2$—$C_{1.2}$). These patterns show the presence of the same phase and match the calculated pattern for $Ni_3Sn_2$. Thus, the addition of carbon to the tin-nickel mixtures yields $Ni_3Sn_2$ and carbon mixtures, and not a new phase.

There are shown in FIGS. 4, 5 and 6, the scanning electron microscope (SEM) images of materials A and B. As shown in FIG. 4, material A appears as a mixture of 1–10 micrometers ($\mu m$) non-spherical, smooth and discrete particles whereas material B, as shown in FIGS. 5 and 6, appears as a porous, non-crystalline phase with non-discrete particles and small particle size, between about 0.5 to 5 $\mu m$. It is clear that the morphology of these materials is different, consistent with the expectation that the impact-grinding speed, and thus the reaction rate, should vary with the ratio of the amount of grinding media (balls) to the amount of material processed.

A number of electrochemical cells were prepared using negative electrodes made from the nickel-tin powders in accordance with the invention. The initial tests were conducted using nickel-tin powders having the composition of material A. The electrodes were prepared by coating onto a nickel foil a suspension of the powdered sample (84 wt %), Super P carbon (9 wt %) and a binder of Poly(vinylidene fluoride)-hexafluoropropylene (PVDF-HFP) (7 wt %) in 1-methyl-2-pyrrolidinone. The coating was dried in the air at 90 degrees C. The electrolyte in the electrochemical cells consisted of 1M solution of $LiPF_6$ in a 1:3 mixture of ethylene carbonate and ethylene methyl carbonate. A lithium metal counter electrode was used in the cells and was separated from the working electrode by a microporous polyethylene separator material. The electrochemical cells, which utilized to 2325 coin cell hardware, were prepared in a glove-box under argon atmosphere.

An Arbin Battery Test System (ABTS)BT 2042 was used to perform the electrochemical tests. The cells were cycled galvanostatically at 238 ($\mu A/cm^2$) to 368 $\mu A/cm^2$, and between 0.0 volts to 0.5 volts or 1.5 volts vs. lithium. The cell temperature was maintained at about 25 degrees C.

FIG. 7 shows the first cycle discharge (alloying, reduction) curve for a cell utilizing material A as the negative electrode material in accordance with the invention. As shown, the cell has a specific capacity of up to about 550 mAh/g with an average voltage of 0.37 V versus Li. This voltage is attractive for Li-ion cells as it is different enough from typical cathode materials to afford appreciable cell voltage but not so close to lithium as to risk formation of metallic lithium.

A cyclic voltammogram of an electrochemical cell utilizing material A as the negative electrode is shown in FIG. 8. As shown, reduction occurs beginning at about 0.2 V and oxidation occurs at about 0.8 V. It is also observed that little polarization (less than 0.6V) is associated with this material. There is also absent any significant irreversible reduction process. The process that occurs on the first reduction from 1.5 V to 0.5 V at low current, less than 0.22 mA, may be the irreversible reduction of adventitious tin oxide impurity on the surface of the tin particles. The cyclic voltammogram is characterized by two reduction peaks, a small one at 0.65V vs. Li and larger peak at 0.21V vs. Li, and an oxidation peak at 0.76V vs. Li.

Cells were prepared using material A at varying specific capacities (mAh/g) as shown in Table 2 below:

TABLE 2

Cells with Varying Capacities

| Cell No. | Specific Capacity (mAh/g) |
|----------|---------------------------|
| Cell 1   | 110                       |
| Cell 2   | 227                       |
| Cell 3   | 300                       |
| Cell 4   | 300                       |
| Cell 5   | 404                       |
| Cell 6   | 401                       |

The electrochemical cells utilized a positive electrode of lithium, a negative electrode of material A, a microporous polyethylene separator and electrolyte as previously described. The cells were cycled galvanostatically at the various levels of alloying indicated in the table. Cells 1–4 were cycled at a current level of 200 $\mu A/cm^2$ while cells 5 an 6 were cycled at 238 $\mu A/cm^2$. Cells 1 and 2 reached the voltage limit. The results of the galvanostatic cycling are shown in FIG. 9. It will be seen first of all that cell 1 was cycled to 675 mAh/mL or 81 mAh/g. This demonstrates clearly that this material offers capacity at least comparable to currently used carbon materials, such as a particular graphite, Osaka Gas MCMB, which offers 660 mAh/mL or 300 mAh/g. It will also be seen that cells employing material A may be cycled galvanostatically at capacities of 838 mAh/mL (100 mAh/g) to 2500 mAh/mL (300 mAh/g) which are far greater than what is possible with carbon. As clearly shown in the FIG. 9, cells employing material A offer both high capacity and low capacity fade. Further, this material has irreversible capacity of only 76 mAh/g, 7.7% of that typical for $SnO_2$, thus overcoming the above mentioned problems precluding the commercial success of prior tin based negative electrode materials. The high capacity density is possible because the density of the tin-nickel material is 8.38 g/mL, versus 2.2 g/mL for carbon. The low irreversible capacity is believed due to the absence of oxygen in the material. Undoubtedly some tin oxide exists on the surface of the particles as the reaction was conducted in air. Assuming that all the irreversible capacity is due to reaction of all the oxygen present in the material to form Li O, it can be shown by calculation that the material may contain no greater than about 2.3% oxygen. It should be further noted that when alloyed to a level of 300 mAh/g, or the final composition $Li_{4.04}Ni_3Sn_2$, the Sn in this material will have expanded by 210%, relative to its volume as tin metal, versus the 310% typical for the expansion of Sn to $Li_{4.4}Sn$ in tin oxide materials. The reduced volume change may relate to the observed stability of these materials upon repeated cycling.

It has been discovered in accordance with the invention that the electrochemical performance of cells employing tin-nickel negative electrode materials (material A) was improved when carbon was mixed with the powder prior to fabricating a coating. To determine if a more intimate mixture of tin, nickel and carbon would provide improved performance, a series of $Ni_3Sn_2$-carbon mixtures, material C (the mixture $Ni_3Sn_2$—$C_{0.2}$), material D (the mixture $Ni_3Sn_2$—$C_{1.2}$), set forth in Table 1 hereinabove, were prepared and tested. The synthesis methods were analogous to those used to prepare material A.

Materials C and D were characterized galvanostatically using electrochemical cells prepared similarly to those described in the case of material A hereinabove. In this experiment, Cell No. 7, utilizing material C, was cycled between 0 and 0.5V at 238 $\mu$A/cm and Cell No. 8, utilizing material D, was cycled between 0 and 1.3V at 317 $\mu$A/cm$^2$. As shown in FIG. 10, these materials offer lower capacity and cycle life than demonstrated with material A. Thus, while the addition of carbon to the coatings of material A improved performance, a more intimate mixture of carbon with the nickel-tin material (material C and D) lowered cell performance.

To further demonstrate the utility of the nickel-tin negative active materials, a number of Li-ion cells were fabricated using either $LiNi_{1-x}Co_xO_2$ or $LiMn_2O_4$ positive electrode materials and nickel-tin negative electrode materials. The nickel-tin material was the same material as material A and the same electrolyte (1:3 mixture of ethylene carbonate and ethyl methyl carbonate with 1M $LiPF_6$) and polyethylene separator were used. The cells were cycled between 4.2 and 2.5V at either a 0.2C or 0.1C rate, where the C is the rate (electric current) required to discharge the cell in one hour, with a capacity limit upon charge to limit over-alloying of the negative electrode above 200 mAh/g.

FIG. 11 shows the charge and discharge voltage over the first two cycles for a $LiNi_{1-x}Co_xO_2$/Ni—Sn cell cycled at the C/10 rate. In this cell the nickel-tin negative electrode material was utilized at 1700 mAh/mL or 200 mAh/g, approximately three times the capacity density typical for carbon.

Similarly, FIG. 12 shows the charge and discharge voltage of a $LiMn_2O_4$/Ni—Sn cell over the first 5 cycles. While the shape of the voltage curves is similar for both types of cells, the spinel cell offers 0.4 V higher average voltage. A plot of the $LiMn_2O_4$/Ni—Sn cell discharge capacity for the initial 8 and 15 cycles for two cells, Cell Nos. 9 and 10, is shown in FIG. 13. The capacity increased during the first two cycles; one cell exhibited capacity fade while the other demonstrated stable capacity. The increase in capacity on the first two cycles is characteristic of the nickel-tin negative electrode of the invention.

What is claimed is:

1. A negative electrode material for a rechargeable lithium-ion electrochemical cell comprising discrete, non-spherical, smooth particles of elemental nickel and tin, said nickel and tin particles ranging in size from about 1 to 10 micrometers and having a density which is greater than about 5 grams per milliliter and a specific surface area of less than about 3 square meters per gram, said electrode material having an X-ray diffraction pattern characterized by the presence of peaks associated with elemental nickel and tin and by the absence of peaks associated with a nickel-tin compound and having an oxygen content of less than about 6 percent by weight of said material.

2. A negative electrode material according to claim 1, wherein said material contains from about 5 to 90 percent by weight of said elemental nickel particles and from about 10 to 95 percent by weight of said elemental tin particles.

3. A negative electrode material according to claim 2, wherein said material has an oxide content of less than about 1 percent by weight of said material.

4. A negative electrode for a rechargeable lithium-ion electrochemical cell comprising a thin metal foil coated with an electrode material composed of discrete, non-spherical, smooth particles of elemental nickel and tin, said nickel and tin particles ranging in size from about 1 to 10 micrometers and having a density which is greater than about 5 grams per milliliter and a specific surface area of less than about 1 square meter per gram, said electrode material having an X-ray diffraction pattern characterized by the presence of peaks associated with elemental nickel and tin and by the absence of peaks associated with a nickel-tin compound and having an oxygen content of less than about 6 percent by weight of said material, and a binder for said nickel and tin particles.

5. A negative electrode according to claim 4, wherein said material contains from about 5 to 90 percent by weight of said elemental nickel particles and from about 10 to 95 percent by weight of said elemental tin particles.

6. A negative electrode according to claim 5, wherein said material has an oxide content of less than about 1 percent by weight of said material.

7. A negative electrode according to claim 4, wherein said foil is composed of nickel and wherein said binder is a poly(vinylidene fluoride)-hexafluoropropylene compound.

8. A rechargeable lithium-ion electrochemical cell comprising a positive electrode containing lithium, a negative electrode capable of intercalating or alloying lithium and a porous separator material interposed there between, said negative electrode comprising a thin metal foil coated with an electrode material composed of discrete, non-spherical, smooth particles of elemental nickel and tin, said nickel and tin particles ranging in size from about 1 to 10 micrometers and having a density which is greater than about 5 grams per milliliter and a specific surface area of less than about 1 square meter per gram, said electrode material having an X-ray diffraction pattern characterized by the presence of peaks associated with elemental nickel and tin and by the absence of peaks associated with a nickel-tin compound and having an oxygen content of less than about 6 percent by weight of said material, and a binder for said nickel and tin particles.

9. A rechargeable lithium-ion electrochemical cell according to claim 8, wherein said electrode material contains from about 5 to 90 percent by weight of said elemental nickel particles and from about 10 to 95 percent by weight of said elemental tin particles.

10. A rechargeable lithium-ion electrochemical cell according to claim 9, wherein said material has an oxide content of less than about 1 percent by weight of said material.

11. A rechargeable lithium-ion electrochemical cell according to claim 9, wherein said foil is composed of nickel and wherein said binder is a poly(vinylidene fluoride)-hexafluoropropylene compound.

12. A method for producing a negative electrode for use in a rechargeable lithium-ion electrochemical cell which process comprises mixing together within a ball mill and in an inert atmosphere from about 5 to about 90 percent by weight of elemental nickel particles and from about 10 to about 95 percent by weight of elemental tin particles for a period of up to about 20 hours, maintaining the ball to particle ratio by weight in the resulting mixture at about 1:1; preparing a suspension of said particle mixture in a binder and coating said suspension onto an inert metal foil.

* * * * *